US008572049B2

(12) United States Patent
Cheung et al.

(10) Patent No.: US 8,572,049 B2
(45) Date of Patent: Oct. 29, 2013

(54) DOCUMENT AUTHENTICATION

(75) Inventors: Daniel Lee Yuk Cheung, Basingstoke (GB); Bejamin Terrick Staniford, Wallasey (GB)

(73) Assignee: International Business Machines Corporation, Armonk, NY (US)

( * ) Notice: Subject to any disclaimer, the term of this patent is extended or adjusted under 35 U.S.C. 154(b) by 2553 days.

(21) Appl. No.: 10/918,899

(22) Filed: Aug. 16, 2004

(65) Prior Publication Data

US 2005/0038787 A1    Feb. 17, 2005

(30) Foreign Application Priority Data

Aug. 16, 2003  (GB) .................................. 0319335.6

(51) Int. Cl.
    *G06F 17/30* (2006.01)
(52) U.S. Cl.
    USPC .......................................................... 707/687
(58) Field of Classification Search
    USPC ........ 707/9, 687; 713/167, 176; 709/206–207
    See application file for complete search history.

(56) References Cited

U.S. PATENT DOCUMENTS

| 5,022,080 | A | 6/1991 | Durst et al. ..................... 380/23 |
| 5,748,738 | A | 5/1998 | Bisbee et al. .................... 380/25 |
| 6,327,656 | B2 * | 12/2001 | Zabetian ........................ 713/176 |
| 2001/0002485 | A1 * | 5/2001 | Bisbee et al. ................. 713/167 |
| 2001/0011350 | A1 | 8/2001 | Zabetian ........................ 713/176 |
| 2002/0023221 | A1 * | 2/2002 | Miyazaki et al. ............... 713/178 |
| 2002/0101994 | A1 * | 8/2002 | Shinzaki ........................ 380/277 |
| 2003/0182552 | A1 * | 9/2003 | Tanimoto et al. .............. 713/170 |
| 2004/0172540 | A1 * | 9/2004 | Tanimoto et al. .............. 713/176 |

FOREIGN PATENT DOCUMENTS

| EP | 0667577 | 8/1995 |
| JP | 01256320 | 9/2001 |
| WO | WO 00/13368 | 3/2000 |
| WO | WO 00/46681 | 8/2000 |

OTHER PUBLICATIONS

Goh, A., et al. "Multiparty Authenticative Mechanisms for Network-Mediated Document-Object Conferencing and Collaborative Processing", Proceedings of Intelligent Systems and Technologies for the New Millennium (TENCON 2000), published 2000, IEEE, pp. 427-432, vol. 3.

* cited by examiner

*Primary Examiner* — Sheree Brown
(74) *Attorney, Agent, or Firm* — Law Office of Jim Boice

(57) ABSTRACT

A method, system, computer program and web service for authenticating a document is described comprising; receiving a request to verify the earliest date of a document, such a request including the document itself; creating a signature of the received document by running the document against a checksum algorithm; searching a database for a matching signature to the created signature; and responding to the request with a date associated with a matched signature. The checksum algorithm is an MD5 algorithm and will produce a unique signature for each non-identical set of binary data and no two sets of binary data will render an identical signature. Signatures are created of the objects of a document. Separate signatures are created of the content and the formatting of the document.

12 Claims, 7 Drawing Sheets

DOCUMENT AUTHENTICATION

FIELD OF INVENTION

This invention relates to a method and apparatus for authenticating the publication date for a document.

BACKGROUND OF THE INVENTION

The Internet has become an extremely popular place for authors to publish work and a great deal of new intellectual property is produced every week from all over the world. However, the significance of protecting intellectual property quite often only becomes apparent sometime after the event and consequently a great deal of work is published without significant care being taken to protect the content.

Authors publishing their work on the Internet run the risk of being plagiarised as it is not difficult for an unscrupulous individual to read the work and pass it off as their own. If an author has not taken measures to prove the existence and content of their work at the time it was published, a dispute may arise between the author and the alleged plagiarist as to who produced the work first. In most legal actions proof of the publication date is crucial.

This was less of a problem in a paper world where a physical paper publication would have the date included which would normally be enough to prove publication date. In the electronic world, inclusion of a simple date field is not enough due to the ease of changing the date.

One solution that addresses this problem is to digitally time stamp the publication when it is received. A web-based document authentication service can provide an author with the facility to upload work, store and time stamp it, and show that the author's work existed at a particular point in time.

In such a web-based document authentication service (see FIG. 1A) an author submits a document to the service and a digital time stamp is created and saved on a database.

This solution has its limitations. Primarily, it relies on the author realising the importance of intellectual property within their publication. They must be the active agent in the process and must register with the service and submit a complete document which is kept in its entirety and stored until the time when they wish to prove its existence. It would be more desirable to have a system which will work even if the author does not realise they need to protect their work.

Another is provided by search engine web caching such as demonstrated by GOOGLE.COM™, a trademarked search engine. Instead of the author being required to submit their document to a trusted third party before publishing, the document is published by the author and is identified by a crawler on the Internet as new content. An author can publish a document on the World Wide Web and a search engine retrieves these documents by crawling the web and storing a copy of the cached document in a database. This is called the cached document solution. Such a solution can be performed by any search engine which caches World Wide Web documents. For instance, GOOGLE.COM™, a trademarked search engine, keeps the most recent generation of documents. Another search engine, ARCHIVE.COM™, another exemplary trademarked search engine, keeps many generations of documents.

Although presently, no search engine offers a specific document authentication service as such, one can regard cached documents on a search engine as one level of authentication. Such a cached document solution is shown in FIG. 1B.

One difficulty with the cached document solution is that in order to be effective over a long period of time, the entire World Wide Web would need to be stored on a single file system. The World Wide Web has been growing at an astonishing rate since its creation so this would seem a difficult task. One thing that has been attempted is to store the thumbnails or representations of pages to give users an idea of what content existed in the past. This certainly reduces storage requirements but since it does not store the full content it is of limited use in establishing whether a particular piece of intellectual property existed in the past.

What is needed is a system that can prove that a document was published on the Internet at a certain time/date without having to store the entire document.

BRIEF SUMMARY OF INVENTION

According to a first aspect of the present invention there is provided a method for authenticating a document comprising;
  receiving a request to verify the earliest date of a document, such a request including the document itself;
  creating a signature of the received document by running the document against a checksum algorithm;
  searching a database for a matching signature to the created signature; and responding to the request with a date associated with a matched signature.

Preferably, the checksum algorithm produces an identical signature when run against a separate but identical sets of binary data. Most preferably the checksum algorithm will produce a unique signature for each non-identical set of binary data and no two sets of binary data will render the identical checksums.

The MD5 algorithm, discovered by Professor Ronald L. Rivest of MIT, is the best-known of these checksum algorithms. The MD5 algorithm takes as input a message of arbitrary length and produces as output a 128-bit "fingerprint" or "message digest" of the input. With such a large fingerprint it is in practice computationally infeasible to produce two messages having the same message digest. The MD5 algorithm is intended for digital signature applications, where a large file must be "compressed" in a secure manner before being encrypted with a private (secret) key under a public-key cryptosystem such as RSA. MD5 digests are only 128 bits in size and thus much smaller than any content they are produced from. This reduces the quantity of information that requires storage. For example, at the time of writing, the Google search engine estimates that there are 3 billion pages on the World Wide Web. If one digest were to be produced for each page, the total size would only be 48 Gb. At the time of writing this could be stored on a medium sized hard drive.

The author must have a copy of the document they are claiming they published in order for them to be able to compare the signatures produced from the current document against the signatures produced from the historical document retrieved by the web crawler. Electronic documents have potentially unlimited lifetimes and if published on the World Wide Web are likely remain published for sometime.

If the author changed the document over time, a signature produced from the present document may not match signatures produced from the historical document. In this case the publication date of the whole document can be authenticated. One further solution recognises that there it is no necessity for the signature process to take place only at the document level. Advantageously the signature process takes place at the document object level. Document objects may be entities such as paragraphs, images, multimedia objects and files. Producing signatures for document objects would provide greater granularity when comparing documents. For example, it would be possible to prove that a single image from a document had been published, or a single paragraph. This has clear advantages; even a document which has significantly changed over the years would still very likely have a reasonable percentage of the same document objects. It would be possible to prove that a high percentage of the document historically existed and it would be possible to identify the parts of the document that were unchanged, this could be essential in proving that a particular idea had been plagiarised or was not novel. This process involves parsing a document from its authored form (HTML, PDF or Word document for example) to an intermediary structured document object model (DOM). Each object, once parsed, will have a signature produced for it by the MD5 algorithm and these will be stored in a relational database.

If the author forgets the original URI of the document then they may be unable to locate the historical signatures. This would mean that a comparison between a recently produced test signature and historical signatures would be impossible. In this solution the historical signatures themselves would be stored in an indexed relational database. The historical signatures would be linked to time stamps of historical documents. When a test signature is submitted for analysis by an author wishing to prove its historicity a search is conducted upon the sorted historical signatures using the test signature as a search key. If the test signature matches any of the historical signatures than the complete historical document record can be retrieved and all the historical signatures that are linked with it.

If the author were to perform some formatting change in all or most of the document objects then all signatures would be different and a match could not be make. An example of this would be changing the amount of space after a full stop throughout the entire document. This is resolved by processing each document object as it is parsed from the main document to ignore formatting characters and white space before producing the signature. Such a solution would reduce and eliminate mismatches due to formatting changes.

According to a second aspect of the present invention there is provided a method for creating an authentication document database comprising:

crawling the web in a logical manner for documents using one or more seed URLs and using the URL links in the documents at the seed URLs and subsequent URLs;

creating a signature of the received document by running the document against a checksum algorithm;

searching a signature database for a matching signature to the created signature; and storing the signature if it is a new signature.

BRIEF DESCRIPTION OF THE DRAWINGS

In order to promote a fuller understanding of this and other aspects of the present invention, an embodiment of the invention will now be described, by means of example only, with reference to the accompanying drawings in which.

DETAILED DESCRIPTION OF INVENTION

Figure 1A:
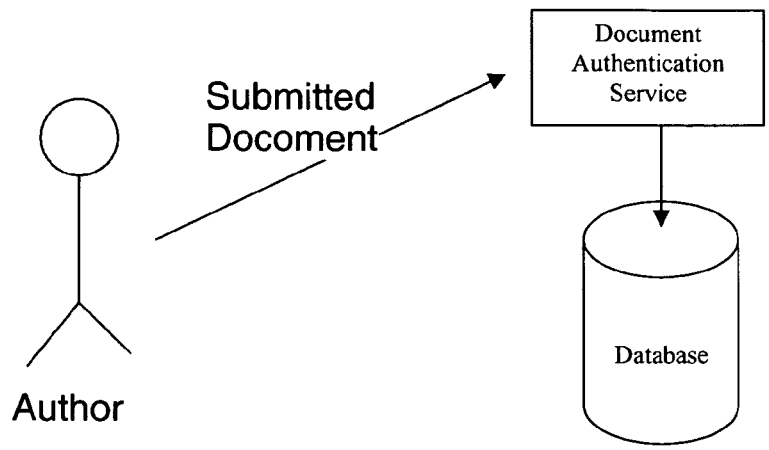
FIG. 1A is a representation of an interaction of an author with a prior art authentication server.
Figure 1B:
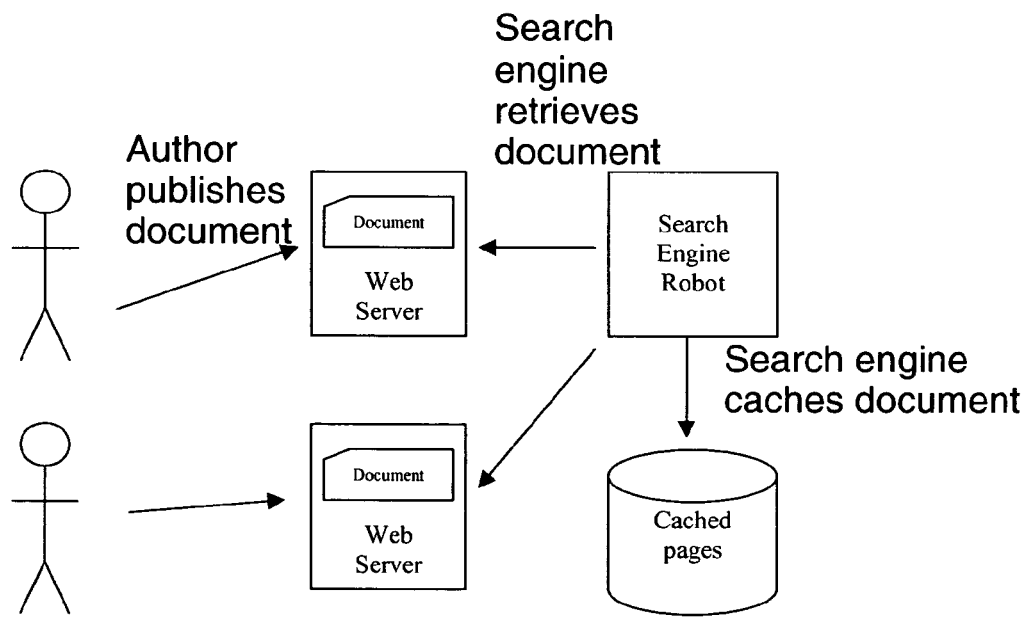
FIG. 1B is a representation of an interaction of authors with a prior art search engine caching server.
Figure 2:
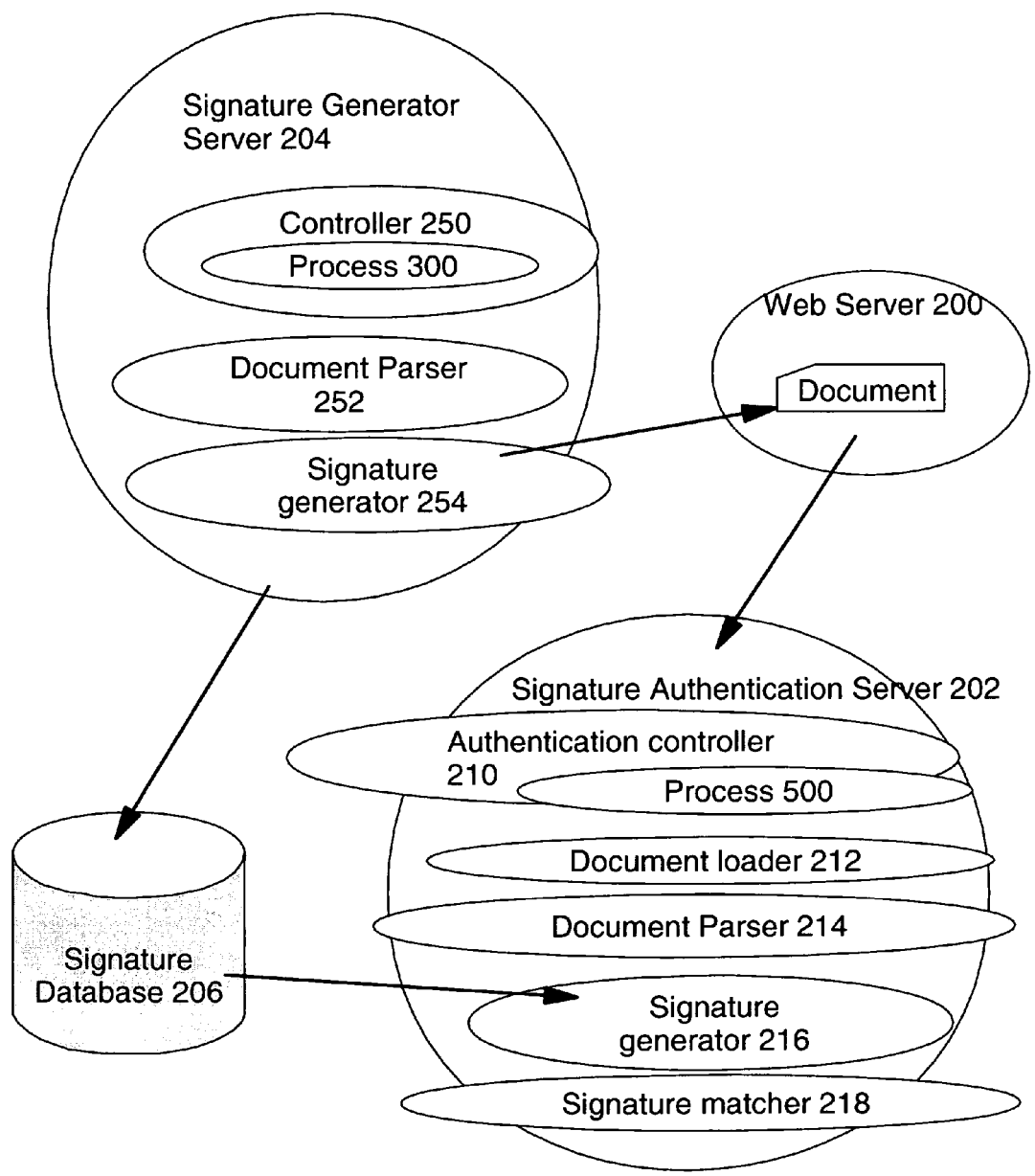
FIG. 2 is schematic representation of the embodiment of the invention.

Referring to FIG. 2, a schematic system overview is shown of the high level components of the preferred implementation of the invention. The preferred embodiment comprises: web server 200; signature authentication server 202; signature generator server 204 and signature database 206.

The signature authentication server 202 comprises: authentication controller 210 and process 500; document loader 212; document parser 214; signature generator 216; and signature matcher 218.

The authentication controller 210 controls the document loader 212; document parser 214; signature generator 216 and signature matcher 218 using process 500.

Document loader 212 crawls the world wide web to retrieve new documents for prior art indexing.

The document parser 214 scans and breaks down the document into component objects comprising: paragraphs, images, tables, lists, etc. In each of these objects the content and formatting of the objects is separated into two separate objects. The document parser 214 further constructs a document object model by arranging a logical hierarchy of the components blocks to represent the document. Deconstruction is required so that a document may be transformed into an intermediary chunk format. XML is the preferred document format, used to parse these XML block tags and provide an abstract representation of the source document in the form of a DOM tree. The advantage of using an XML Parser in this instance is that any immaterial or formatting changes to the document are ignored such as white space. Each object of the DOM tree contains only useful content which will be used to determine document authenticity. An MD5 algorithm is then required to process unique signatures of the document as a whole and each of its constituent objects. These signatures are then stored in the signature database 206 providing a unique lookup reference for that document.

The signature generator 216 is then applied to the component objects and provides a signature for each component object.

Signature matcher 218 takes the signatures generated by signature generator 216 and searches the signature data 206 for exact and close matches.

The signature generation server 204 is one part of a search engine. Its role is to crawl the world wide web searching for new or updated documents and generate signatures. The signature generator server 204 comprises: generator controller 250 and process 300; document parser 252; and signature generator 254.

The generator controller 250 controls the document parser 252 and signature generator 254 using the process 300.

The document parser 252 is the same type as document parser 214 in the signature authentication server 202.

The signature generator 254 is the same type as signature generator 216 of the signature authentication server 202.

Figure 3:
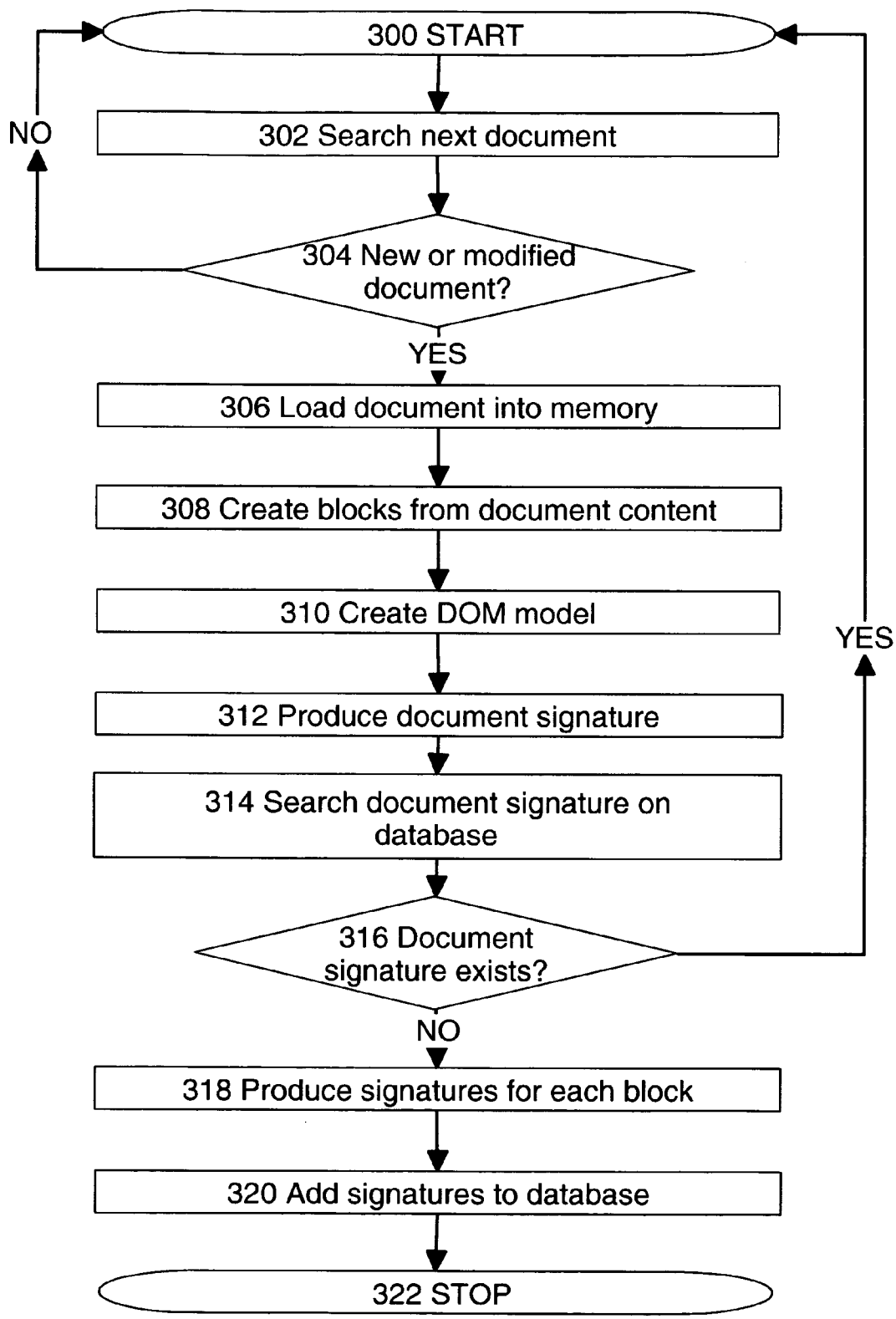
FIG. 3 is a schematic representation of the method used to produce a signature database according to the embodiment.

FIG. 3 shows the stages and decisions of process 300 in the signature generator server 204 to add signatures to the signature database 206. The signature generator server 204 finds, step 302, a document by crawling the web in a logical manner.

A check is made, step 304, to see if the found document is a new document or one that has been modified recently. If it is old then its signature should already reside in the signature database 206 and the server moves onto the next document in its logical crawl through the web (back to start at step 300).

Otherwise, the new document is loaded, step 306, into memory, deconstructed, step 308, into its constituent objects.

From the constituent objects (including formatting objects and content objects) a DOM tree is created, step 310.

An MD5 algorithm produces, step 312, a primary signature for the whole document and a set secondary of signatures for each object of the DOM tree. A search, step 314, for the primary signature is then performed on the database. If the result, step 316, of the search is positive this means that changes to the document were immaterial, all the signatures are thrown away and the whole process starts again, step 300, moving onto the next document. If the result of the search is negative then the document is either new or its content has changed and the process moves to step 318.

The MD5 algorithm produces (step 318) further unique secondary signatures for the objects of the document. These signatures are then added (step 320) to the database with their associated time stamp.

Figure 4:
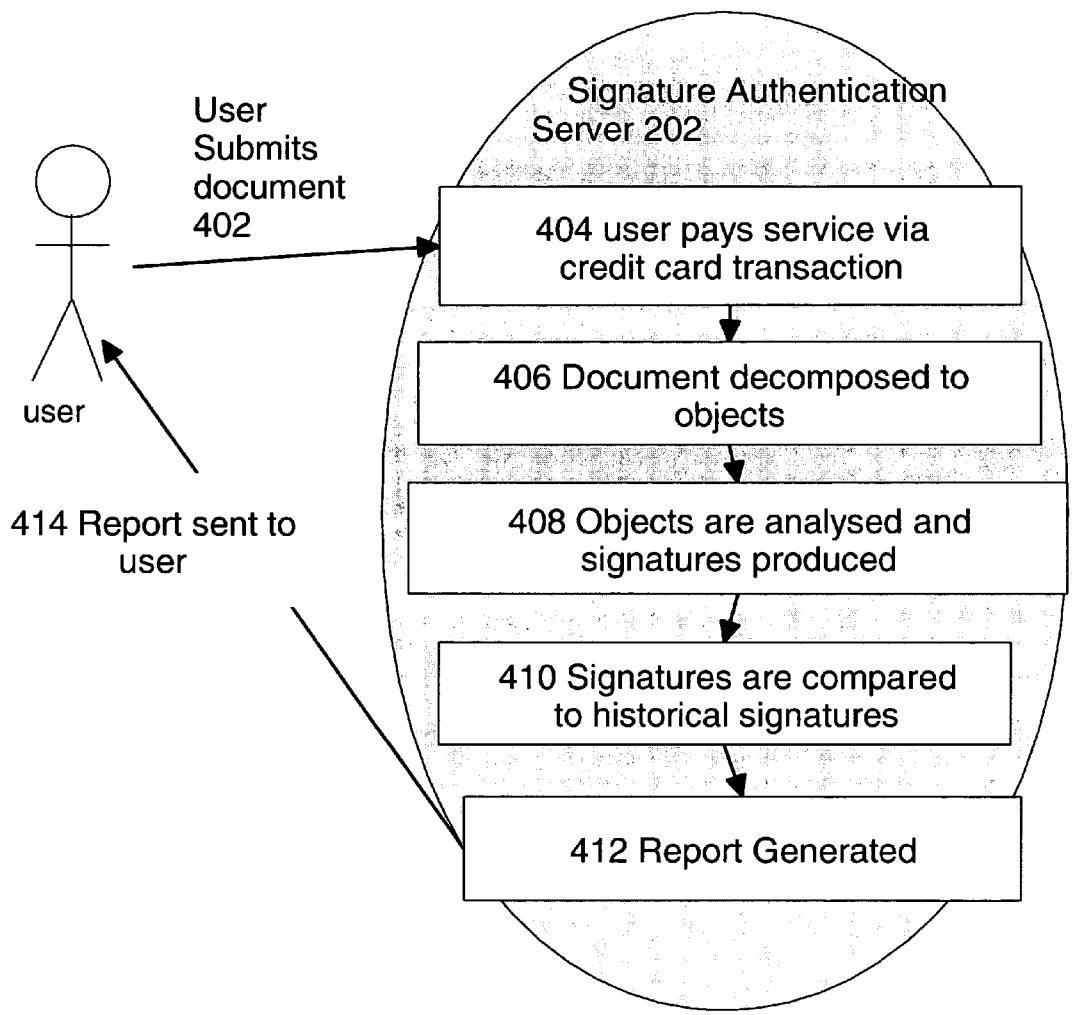
FIG. 4 show a general flow diagram of the web authentication service of the present embodiment.
Figure 5:
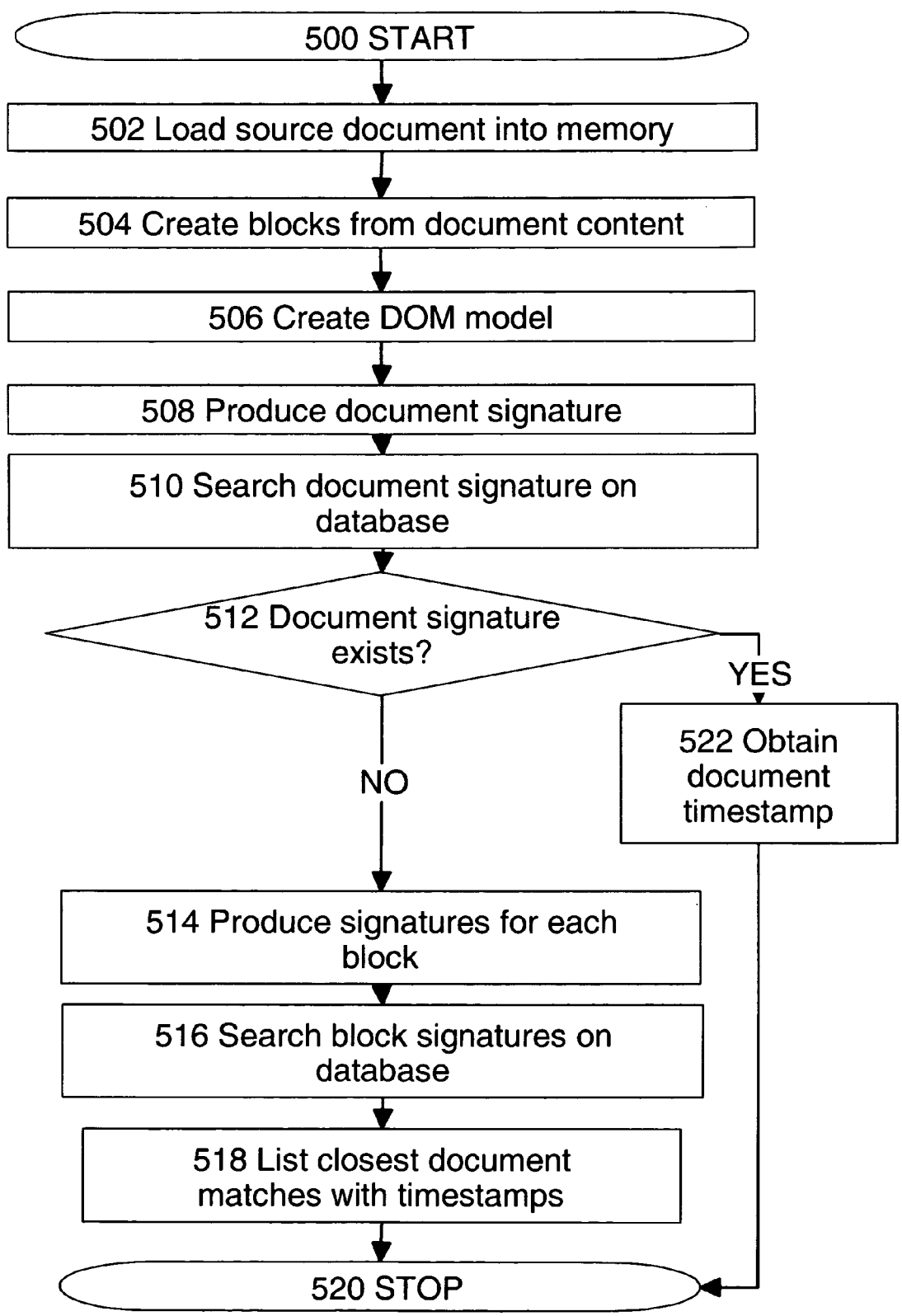
FIG. 5 shows method steps of the web authentication server performing the web authentication service of the present embodiment.

FIG. 4 shows a schematic process flow of the web service (400) of authenticating a document on the web (FIG. 5 shows the process of the web authentication server performing the service).

An author 402 submits a document for authorisation to the signature authorisation server 202. A fee is charged for submitting the document and the user pays (step 404) for the service with a credit card.

The submitted document is decomposed into component objects (step 406).

Each of the objects is analysed and a hierarchy of signatures produced (step 408).

The hierarchy of signatures are compared with stored signatures hierarchies (step 410) and a report generated (step 412) regarding the comparison. The report is then sent to the user (step 414).

In order to prove authenticity of the documents they are processed by the signature authentication server to produce their corresponding document signatures. These signatures are then searched for in the database producing matches. The associated time stamps with these signatures prove the authenticity of the original and updated documents.

The signature database is indexed and sorted by document signatures which provides the unique primary reference key for each document. The object signatures contained within the document act as tertiary reference keys. Using this system makes the whole system robust so that even if the user were to move the document to a different directory/domain or rename it, the document can still be identified by its content.

Further analysis of the object signatures enables identification of blocks which have changed or have been added. So, one is able to measure the level of deviation between the original document and the updated one. This is very useful for determining and proving original content.

FIG. 5 shows the control process (500) of the different stages and decisions used in the web authentication server for authenticating source documents on the web. The document is loaded (502) into memory, deconstructed (504) into its constituent objects and a DOM tree representation is made (506) of the document.

A document signature is obtained (508) and searched (510) for on the database. If (512) the document signature exists on the database then the time stamp is obtained (522) and the process finishes. Otherwise, object signatures are obtained (514) from the DOM tree and a search is performed (516) in the database to match any of these block signatures.

The document signatures with the highest number of block matches are listed (518) in descending order with corresponding time stamps and the process finishes (520).

From the closest matches, it is possible to relate a historical audit trail of changes made to the current document and prove authenticity of content because of the uniqueness of the MD5 signature.

Figure 6:
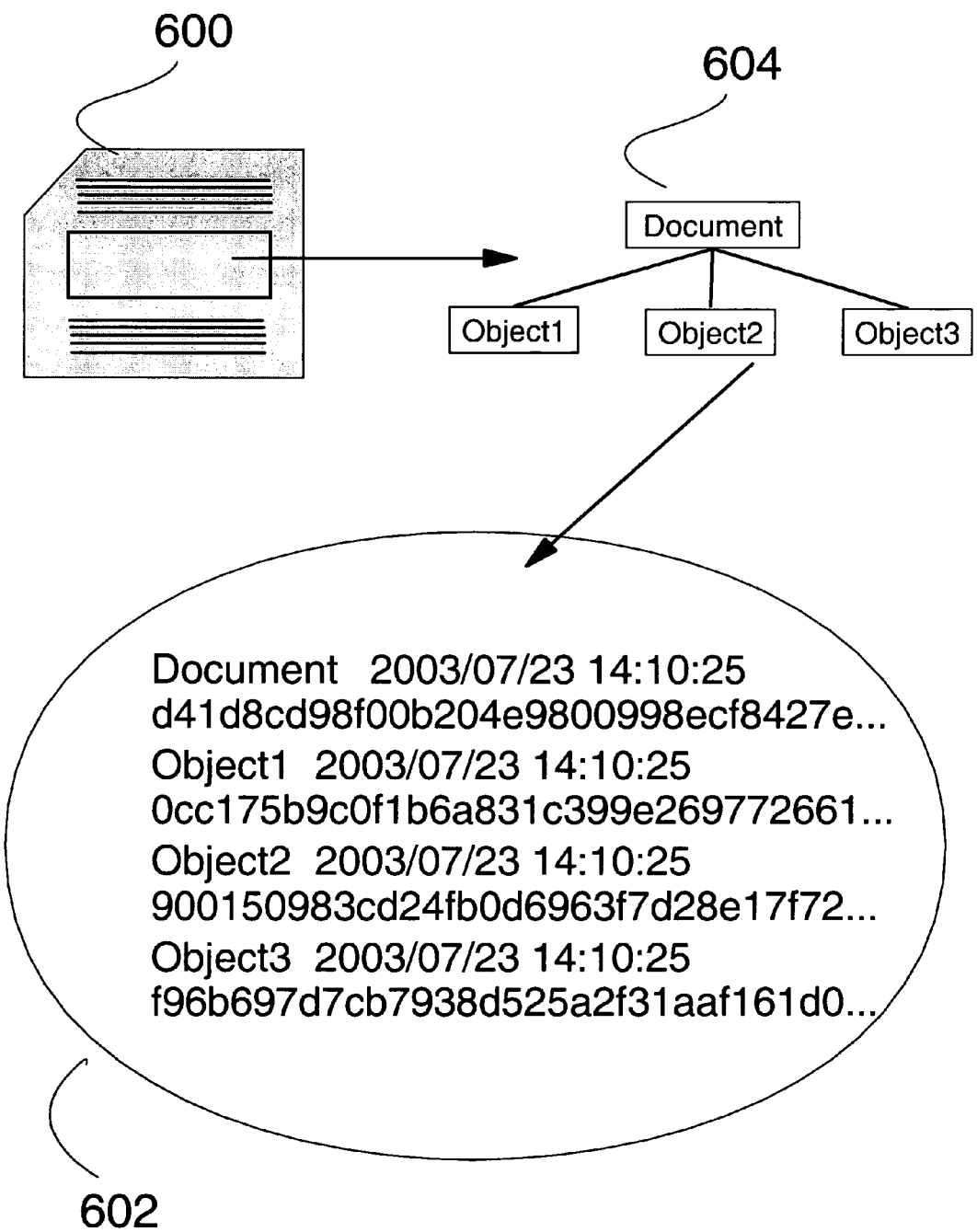
FIG. 6 shows an example document and corresponding set of signatures according to the embodiment.

FIG. 6 shows document 600's original form and corresponding set of signatures 602 that will be used to identify it. The intermediary stage 604 producing the DOM tree representation of the document is necessary for ironing out any immaterial changes to the document and providing a vehicle for authenticating significant portions of the source document.

Figure 7:
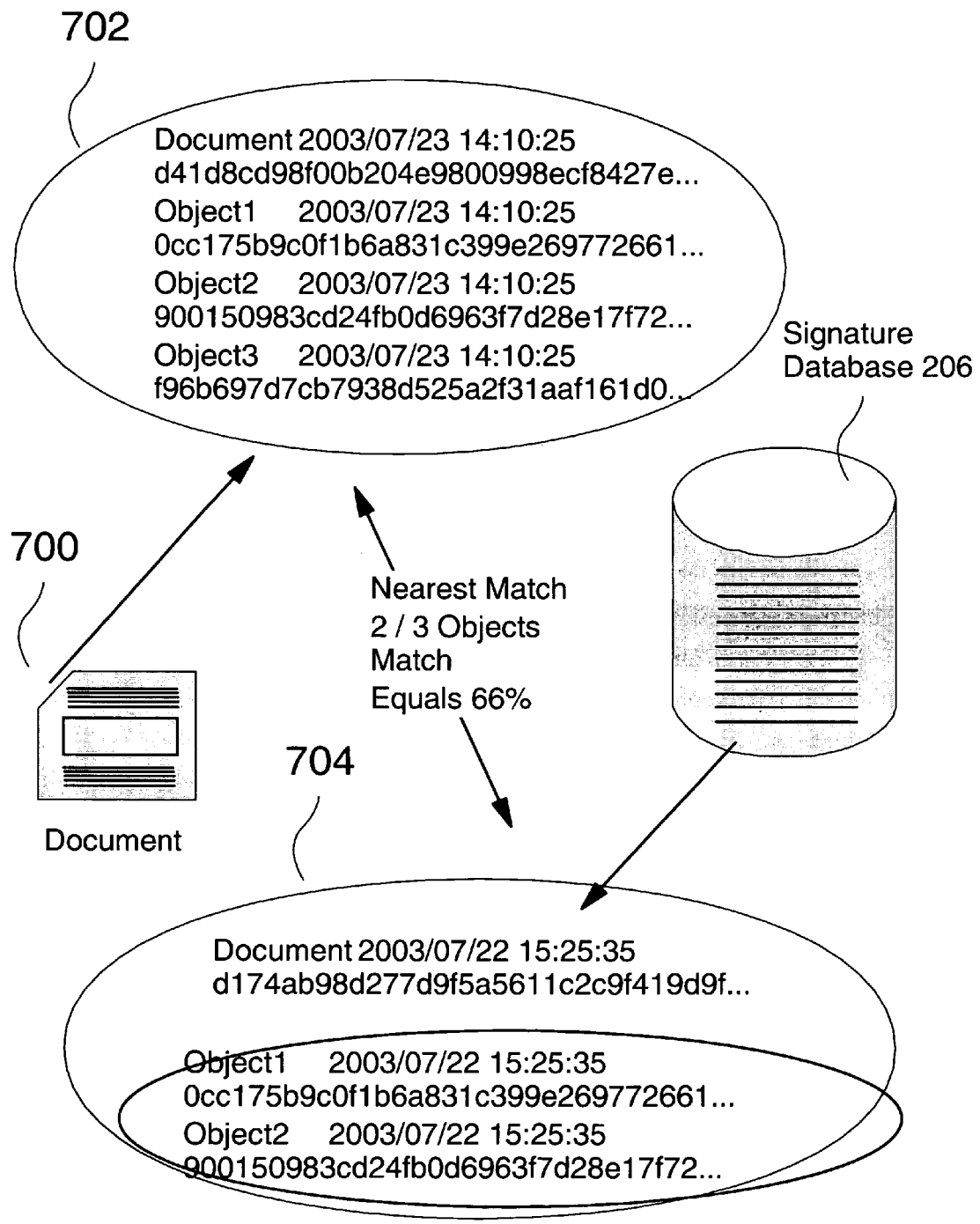
FIG. 7 shows an example of how a current document may prove partial content authenticity even though the original document has been lost.

FIG. 7 shows an example of how a document 700 can be analysed for content authenticity even though the original document has been lost. In this case, signature 702 is produced for document 700. A search is performed in the database but no match is found. Further searches are performed on the object signatures resulting a nearest match signature 704.

From the nearest match signature 704, an audit report is created of changes made to the document may be traced with their associated time stamps. Hence, one is able to prove when significant parts of the document existed and also a measure of deviation over time.

In the example, two out of three blocks have not changed and a third block has been deleted. This equates to the document having changed by 33% since its initial creation.

While it is understood that the process software may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server then stored on the proxy server.

The process software is integrated into a client, server and network environment by providing for the process software to coexist with applications, operating systems and network operating systems software and then installing the process software on the clients and servers in the environment where the process software will function. The first step is to identify any software on the clients and servers including the network operating system where the process software will be deployed that are required by the process software or that work in conjunction with the process software. This includes the network operating system that is software that enhances a basic operating system by adding networking features. Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level. After ensuring that the software, where the process software is to be deployed, is at the correct version level that has been tested to work with the process software, the integration is completed by installing the process software on the clients and servers.

The process software is shared, simultaneously serving multiple customers in a flexible, automated fashion. It is standardised, requiring little customization and it is scalable, providing capacity on demand in a pay-as-you-go model. The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc. When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to effect the performance of that server, other servers are accessed to increase the capacity and to share the workload. Likewise when other measurements of use such as network bandwidth, memory usage, storage usage, etc. approach a capacity so as to effect performance, additional network bandwidth, memory usage, storage etc. are added to share the workload. The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider. In another embodiment, the service provider requests payment directly from a customer account at a banking or financial institution. In another embodiment, if the service provider is also a customer of the customer that uses the process software application, the payment owed to the service provider is reconciled to the payment owed by the service provider to minimise the transfer of payments.

The process software may be deployed, accessed and executed through the use of a virtual private network (VPN), which is any combination of technologies that can be used to secure a connection through an otherwise unsecured or distrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid. The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software. When using the site-to-site VPN, the process software is deployed, accessed and executed through the use of dedicated equipment and large-scale encryption that are used to connect a companies multiple fixed sites over a public network such as the Internet. The process software is transported over the VPN via tunneling which is the process the of placing an entire packet within another packet and sending it over a network. The protocol of the outer packet is understood by the network and both points, called tunnel interfaces, where the packet enters and exits the network.

What is claimed is:

1. A method for authenticating a publication date for a document, the method comprising:
    parsing, by one or more processors, a document from its authored form into document objects, wherein the document objects are subcomponents of the document;
    separating, by one or more processors, each of the document objects into a content object and a formatting object, wherein the content object contains content, and wherein the formatting object contains code that describes a presentation format of the content;
    generating, by one or more processors, a different digital signature of the content objects for each of the content objects;
    comparing, by or more processors, each different digital signature with a stored hierarchy of digital signatures, wherein the stored hierarchy of digital signatures includes a time stamp describing when each stored digital signature was last updated in an authorized manner;
    based on said comparing of each different digital signature with the stored hierarchy of digital signatures, determining, by one or more processors, if the document contains only authorized changes that have been previously recorded in the stored hierarchy of digital signatures; and
    generating, by one or more processors, a report describing results of said comparing and determining steps.

2. The method of claim 1, further comprising:
    transmitting, by one or more processors, said report to a user.

3. The method of claim 2, further comprising:
  storing, by one or more processors, the stored hierarchy of digital signatures in an indexed relational database, wherein the stored hierarchy of digital signatures comprise historical signatures that are linked to time stamps for each of the historical signatures.

4. The method of claim 3, further comprising:
  determining, by one or more processors, what percentage of the document contains unauthorized content by determining how many of the document objects have digital signatures that are not found in the stored hierarchy of digital signatures.

5. A computer program product for authenticating a publication date for a document, the computer program product comprising a non-transitory computer readable storage medium having program code embodied therewith, the program code readable and executable by a processor to perform a method comprising:
  parsing a document from its authored form into document objects, wherein the document objects are subcomponents of the document;
  separating each of the document objects into a content object and a formatting object, wherein the content object contains content, and wherein the formatting object contains code that describes a presentation format of the content;
  generating a different digital signature of the content objects for each of the content objects;
  comparing each different digital signature with a stored hierarchy of digital signatures, wherein the stored hierarchy of digital signatures includes a time stamp describing when each stored digital signature was last updated in an authorized manner;
  based on said comparing of each different digital signature with the stored hierarchy of digital signatures, determining if the document contains only authorized changes that have been previously recorded in the stored hierarchy of digital signatures; and
  generating a report describing results of said comparing and determining steps.

6. The computer program product of claim 5, wherein the method further comprises:
  transmitting said report to a user.

7. The computer program product of claim 6, wherein the method further comprises:
  storing the stored hierarchy of digital signatures in an indexed, relational database, wherein the stored hierarchy of digital signatures comprise historical signatures that are linked to time stamps for each of the historical signatures.

8. The computer program product of claim 7, wherein the method further comprises:
  determining what percentage of the document contains unauthorized content by determining how many of the document objects have digital signatures that are not found in the stored hierarchy of digital signatures.

9. A computer system comprising:
  a processor, a computer readable memory, and a computer readable storage medium;
  first program instructions to parse a document from its authored form into document objects, wherein the document objects are subcomponents of the document;
  second program instructions to separate each of the document objects into a content object and a formatting object, wherein the content object contains content, and wherein the formatting object contains code that describes a presentation format of the content;
  third program instructions to generate a different digital signature of the content objects for each of the content objects;
  fourth program instructions to compare each different digital signature with a stored hierarchy of digital signatures, wherein the stored hierarchy of digital signatures includes a time stamp describing when each stored digital signature was last updated in an authorized manner;
  fifth program instructions to, based on said comparing of each different digital signature with the stored hierarchy of digital signatures, determine if the document contains only authorized changes that have been previously recorded in the stored hierarchy of digital signatures; and
  sixth program instructions to generate a report describing results of said comparing and determining; and wherein said first, second, third, fourth, fifth, and sixth program instructions are stored on said computer readable storage medium for execution by said processor via said computer readable memory.

10. The system of claim 9, further comprising:
  seventh program instructions to transmit said report to a user; and wherein
  said seventh program instructions are stored on said computer readable storage medium for execution by said processor via said computer readable memory.

11. The system of claim 10, further comprising:
  eighth program instructions to store the stored hierarchy of digital signatures in an indexed relational database, wherein the stored hierarchy of digital signatures comprise historical signatures that are linked to time stamps for each of the historical signatures; and wherein
  said eighth program instructions are stored on said computer readable storage medium for execution by said processor via said computer readable memory.

12. The method of claim 11, further comprising:
  ninth program instructions to determine what percentage of the document contains unauthorized content by determining how it of the document objects have digital signatures that are not round in the stored hierarchy of digital signatures; and wherein
  said ninth program instructions are stored on said computer readable storage medium for execution by said processor via said computer readable memory.

* * * * *